May 18, 1965 A. R. CHASAR 3,184,083
LOAD CHECKING AND POSITIONING DEVICES
FOR AUTOMATIC WAREHOUSE SYSTEM
Filed Jan. 25, 1963 3 Sheets-Sheet 1

INVENTOR.
ANTHONY R. CHASAR
BY
Meyer Baldwin, Doran & Egan
ATTORNEYS

United States Patent Office 3,184,083
Patented May 18, 1965

3,184,083
LOAD CHECKING AND POSITIONING DEVICES FOR AUTOMATIC WAREHOUSE SYSTEM
Anthony R. Chasar, Mentor, Ohio, assignor to The Triax Company, Cleveland, Ohio, a corporation of Ohio
Filed Jan. 25, 1963, Ser. No. 253,968
6 Claims. (Cl. 214—95)

This invention relates to automatic warehousing systems in general and more particularly to a load carrier therefor having load checking, positioning, and correcting means.

A fully automatic warehousing system of the type referred to is disclosed in my co-pending application Serial No. 66,776, filed November 2, 1960, and entitled "Mechanical Load Handling, Transfer and Storage Equipment," now United States Patent No. 3,139,994 issued July 7, 1964. Briefly, such a system comprises a skeletal storage frame having a central aisle on either side of which are provided vertically and horizontally aligned rows of load supports. A carrier is provided having a main frame which moves vertically and horizontally in the aisle for movement between the different supports, and said frame has a laterally extendible extractor movable into guideway means provided at each support for depositing or retrieving a load from said support.

A load ordinarily comprises a pallet of uniform, predetermined size which is carried by the extractor and upon which may be placed one or more articles to be stored or retrieved. In transferring the load from the carrier to the support or from said support to said carrier, the problem arises that occasional loads may be skewed relative to the extractor or may be oversize for the storage frame openings at the supports. This can result in a collision between either the load and the storage frame or said load and the main frame of the carrier, depending upon whether the extractor is moving a load into or out of the storage frame at the time. Such collision can cause jamming and damage to the entire system as well as injury to an article being handled.

An important object of the present invention is to provide a load carrier for an automatic warehousing system having load checking and positioning means which will assure that a load entering a storage bin will be substantially aligned with the carrier extractor.

Anther important object of the invention is to provide such load checking and positioning means which will automatically correct the skewness of a crooked load as it is moved out of said storage frame and into the main frame of the carrier.

Still another important object of the invention is to provide load checking and positioning means as set forth above which will automatically prevent oversize loads from moving into the main frame of the carrier.

Further objects of the present invention and a number of its advantages will be referred to in or will be evident from the following description of one embodiment of the invention, illustrated in the accompanying drawings, in which.

Figure 1:
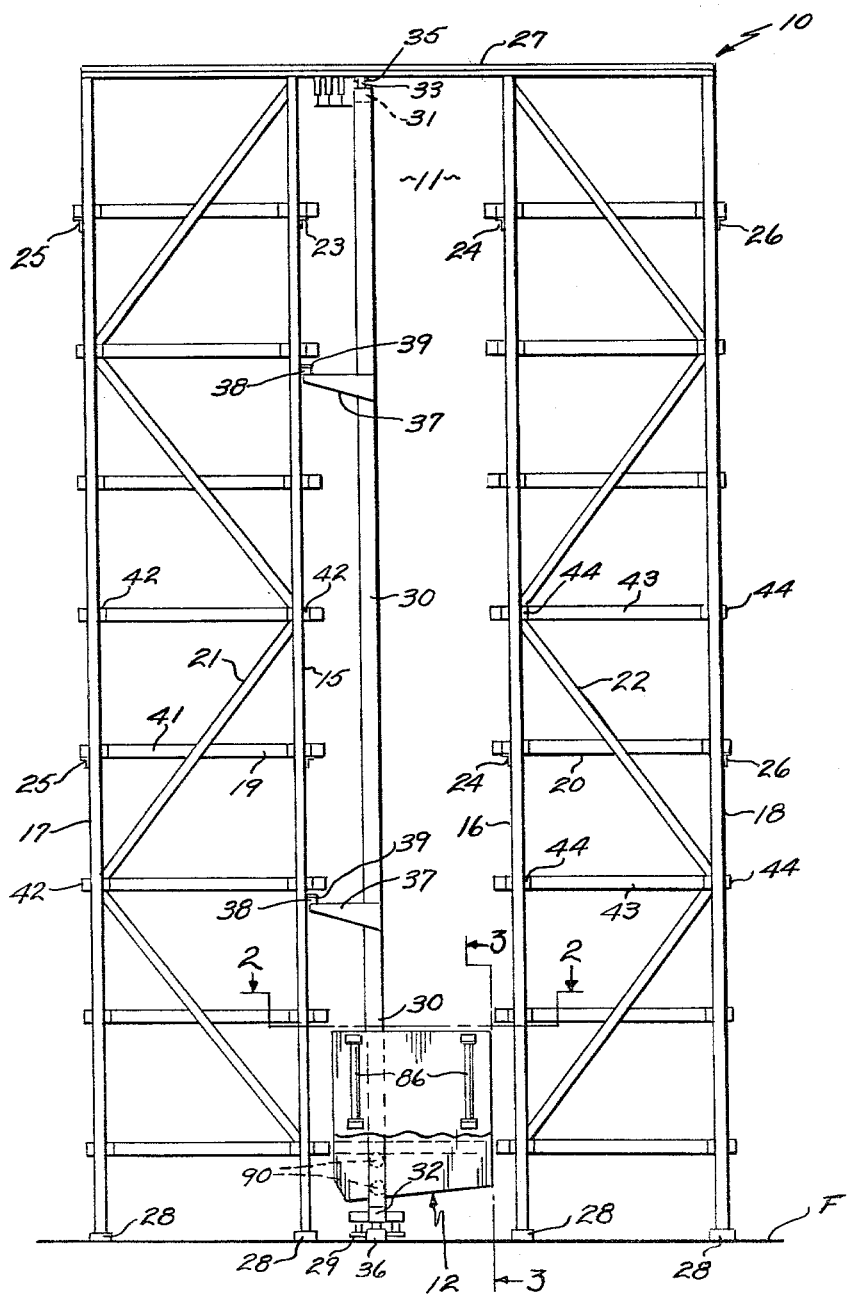
FIG. 1 is an end elevation of the storage frame of an automatic warehousing system wherein there is shown a side view of a load carrier disposed in the aisle of said frame.

FIG. 1 shows generally an automatic warehousing system comprising a skeletal storage frame 10 having an aisle 11 in the middle thereof in which said aisle is disposed a load carrier 12. The storage frame 10 comprises parallel rows of aisle posts 15 and 16, disposed on either side of the aisle 11, and outwardly spaced, parallel rows of outer posts 17 and 18 corresponding in number and spacing to said aisle posts. The posts 15 and 17 carry transverse load supports 19 disposed at different levels, and posts 16 and 18 similarly carry correspondingly positioned load supports 20. Each pair of transversely aligned posts 15 and 17 are reinforced by diagonal braces 21, and similarly aligned pairs of posts 16 and 18 are reinforced by diagonal braces 22. All of the aisle posts 15 are connected together in a direction parallel with the aisle 11 by longitudinal stringers 23, and all of the aisle posts 16 are similarly connected together by longitudinal stringers 24. The outer posts 17 are also connected together in a direction parallel with the aisle 11 by longitudinal stringers 25, and the outer posts 18 are similarly connected together by longitudinal stringers 26. Each transverse group of aligned posts 15, 16, 17, and 18 are connected across their upper ends by cross members 27. The posts in any given row parallel with the aisle are connected together at their lower ends by a longitudinal base stringer 28 which, in turn, is mounted upon a floor or base surface F. All of the frame members are made out of steel and are welded, bolted, or otherwise suitably secured together to effect a rigid, substantially non-yielding structure.

The load carrier 12 comprises a pair of vertically upright, parallel masts 30 which are spaced from each other in the direction of the aisle 11 and are connected together at their upper ends by a cross bar 31 and at their lower ends by a cross bar 32. The masts 30 and the cross bars 31 and 32 form a rectangular frame adapted to move horizontally along the aisle 11. The cross bar 31 carries rollers 33 at the upper end of the rectangular frame for rolling engagement with an overhead track 35 disposed parallel with the aisle and carried by the cross members 27. Cross bar 32 is provided with rollers 34 which engage a base track 36 mounted upon the surface F and disposed directly beneath the track 35. Intermediate the upper and lower ends of the masts 30 they are provided with laterally directed stabilizing arms 37 the distal ends of which carry rollers 38 rotatable upon vertical axes. The stabilizing arms 37 project in the direction of the row of aisle posts 15, and said row of posts is provided with a pair of inverted, U-shaped guide stringers 39 in which the rollers 38 are disposed. The arms 37 stabilize the carrier 12 and prevent the elongated masts 30 from bowing or deflecting excessively. The rollers 34 of the lower cross bar 32 are held against transverse displacement relative to the base track 36 by stabilizing rollers 29 which are carried by said cross bar 32 and engage either side of the base track 36.

Figure 2:
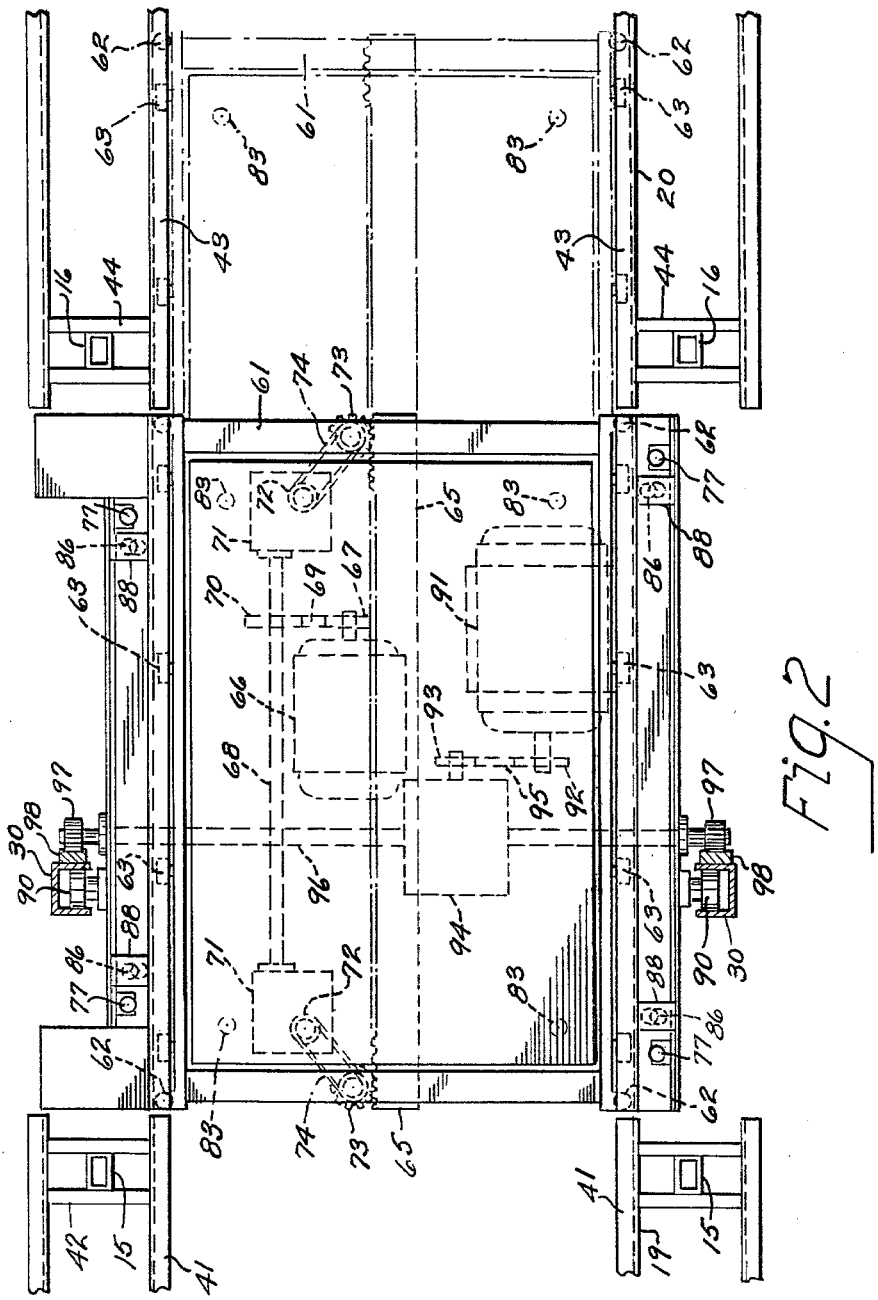
FIG. 2 is an enlarged top plan view of the carrier and certain load supports as taken along the line 2—2 of FIG. 1.

Referring now to FIGS. 1 and 2, each load support 19 comprises a pair of channel-shaped members 41 disposed in a single horizontal plane and connected to adjacent, transversely aligned pairs of aisle and outer posts 15 and 17 with the open sides of the channels directed toward each other. The channel members 41 are disposed transversely to the direction of the aisle, each said channel member being secured to a pair of posts 15 and 17 by short brace members 42. Two brace members 42 are welded on opposite sides of each post 15 or 17 and are disposed parallel with the aisle. Said brace members project beyond their associated posts a substantial distance, and the web portions of the channel members 41 are welded to the distal ends of said brace members. The upper flanges of the channel members 41 and the upper surface portions of the brace members 42 which project beyond the posts 15 or 17 provide supporting surfaces across which a load is bridged for storage purposes. The load supports 20 associated with the aisle and outer posts 16 and 18 are identical in construction with the load supports 19. Said load supports 20 comprise pairs of oppositely facing channel members 43 carried at the distal ends of brace members 44 which are in turn carried by the posts 16 and 18. Each load support 19 on one side of the aisle 11 is disposed directly opposite a like load support 20 on the opposite side of said aisle and the load carrier 12 in any given load transferring position can, therefore, deposit or retrieve a load on either side of said aisle.

Figure 3:
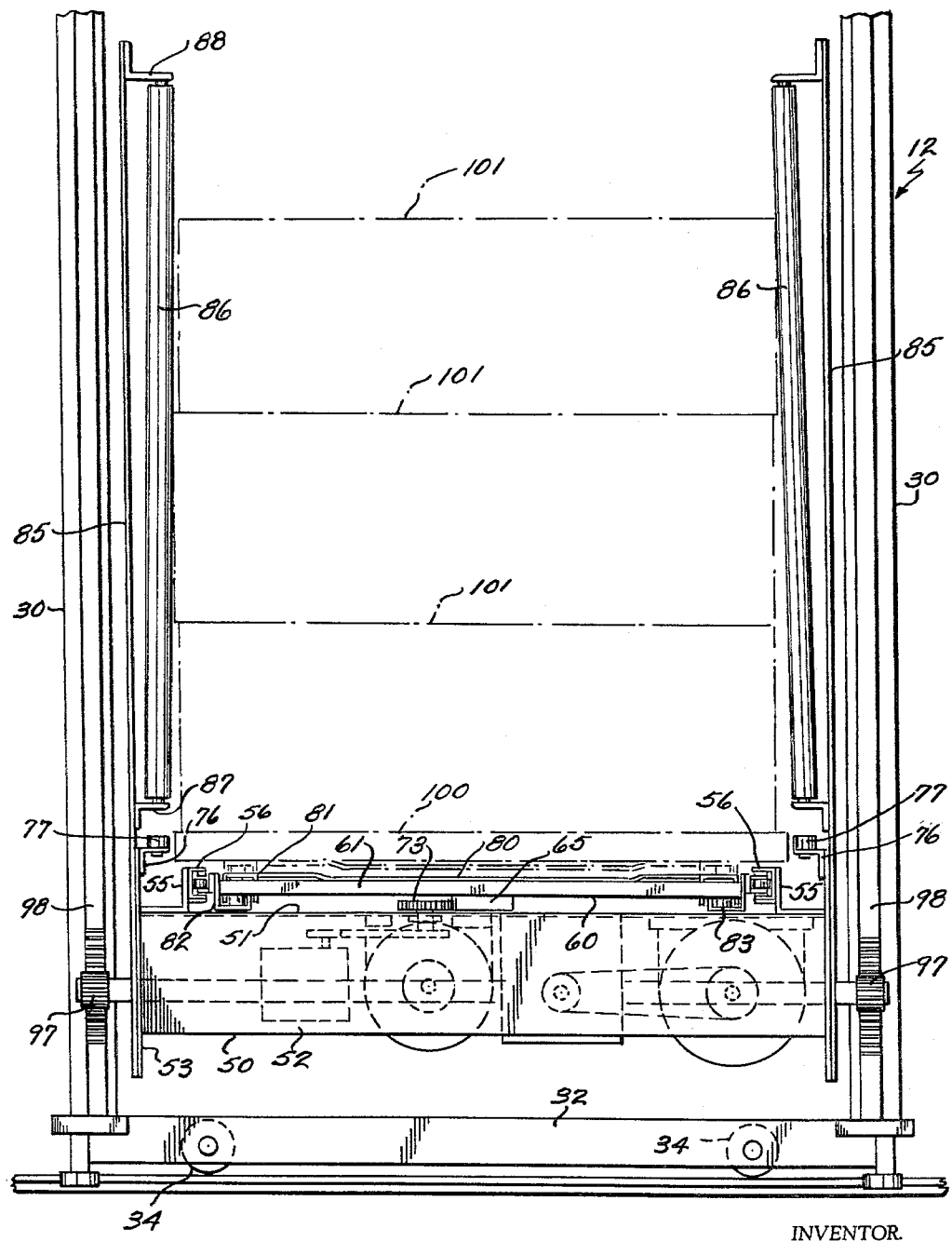
FIG. 3 is an end elevation of the carrier as viewed from the line 3—3 of FIG. 1.

Referring now to FIG. 3, the load carrier 12 has a vertically movable main frame 50 disposed between the masts 30 and comprising a horizontal base 51, downwardly directed end walls 52, and upwardly and downwardly directed side walls 53. Below the base 51, within the enclosure formed by the end walls 52 and the side walls 53, there are disposed suitable motor and power transfer means for moving various components of the carrier which said means will be herein later referred to. It will be understood that additional power means (not herein illustrated) is provided for moving the entire carrier including the masts 30 horizontally along the aisle 11 to different vertical rows of the support means.

A pair of L-shaped supports 55 are mounted upon the base 51 adjacent to the side walls 53 and carry on their upwardly directed portions a pair of channel members 56. The channel members 56 are disposed in a single horizontal plane with their open sides facing each other and are of the same size and are spaced the same distance apart as the channel members 41 or 43 of the load supports 19 or 20, respectively. By means of the combined movements of the mast 30, moving horizontally along the aisle, and the main frame 50, moving vertically in the aisle, these channel members 56 are brought into exact vertical and horizontal alignment with any selected pair of opposite load supports 19 and 20 in use of the carrier.

An extractor 60 having a rectangular frame 61 is disposed between the channel members 56. The edges of said rectangular frame 61 which are disposed adjacent to said channel members are provided with axially vertical and axially horizontal rollers 62 and 63, respectively, which are disposed within the adjacent channel members 56. By means of said rollers 62 and 63, the extractor frame 61 is movable in either of two opposite directions out of the main frame 50 into aligned channel members 41 or 43 of a load support 19 or 20, respectively.

The extractor frame 61 may be driven transversely out of the aisle 11 by any suitable means. In the embodiment of the invention herein illustrated, said extractor frame carries a rack 65 on its lower surface which is aligned with the direction of movement of the extractor 60. Beneath the base 51 there is provided a motor 66 having a drive sprocket 67 which drives a synchronizing shaft 68 by means of a chain 69 and a driven sprocket 70 of said shaft. The shaft 68 is disposed parallel with the rack 65, the ends thereof drivingly connected to gear reducers 71 having output pulleys or sprockets 72. Pinions 73 carried by the base 51 adjacent to the end walls 52 engage the toothed edge of the rack 65 and are driven off of the output sprockets 72 through chains 74. The motor 66 is reversible whereby the extractor 60 can be driven in either transverse direction out of the aisle 11 with one of the pinions 73 always remaining in engagement with the rack 65 whereby the return movement of the extractor into the main frame 50 can be effected.

The side walls 53 extend upwardly above the base 51 and slightly above the extractor carrying channel members 56. At each end of each side wall adjacent to the upper edge of said side wall there is provided a bracket 76 which carries an axially vertical wheel 77. The wheels 77 are disposed in a single horizontal plane a short distance above the upper flanges of the channel members 56 and afford peripheral rolling surfaces of substantially short axial dimension.

The extractor frame 61 of the extractor 60 carries a vertically movable platform 80 which is movable between the full line showing of FIG. 3, wherein it is disposed below the upper flanges of the channel members 56, and the broken line showing of the same figure, wherein it is disposed a short distance above the upper flanges of said channel members. At each corner of the platform 80 there is provided a downwardly open, U-shaped bracket 81, and adjacent to each corner of the extractor frame 61 there is correspondingly provided an upwardly open, U-shaped bracket 82. A hydraulic jack 83 is interposed between each pair of brackets 81 and 82 whereby upon actuation of all of said jacks, the platform 80 is raised vertically by the upward pressure applied thereto at its four corners.

The platform 80 is adapted, in its raised position, to carry a load. This disposes the load above the level of the channel members 56 of the main frame and, consequently, above the level of any channel members 41 and 43 of the storage frame which are aligned with the members 56. With the platform carrying a load in the raised position, the extractor 60 can be extended laterally out of the main frame 50 and into a load support 19 or 20 with the load passing well above the channel members 41 or 43. Subsequent lowering of the platform below the level of the upper flanges of the channel members 56 and the channel members 41 or 43 deposits the load upon a load support 19 or 20 after which the extractor may be freely returned to the main frame. Retrieving a load is, of course, effected by moving the extractor from the main frame into a load support with the platform 80 in its lowered position whereby it will readily pass beneath a load at said load support. Subsequent raising of the platform then lifts the load off of the load support whereby both extractor and load can be returned to the main frame.

The main frame 50 also has vertically upright and parallel side wall extensions 85 which are secured at their lower ends flatwise against the side walls 53 and extend upwardly thereabove a substantial distance on either side of the extractor 60. The side wall extensions 85 define the area wherein a load is normally positioned upon the carrier when the extractor is positioned within the main frame 50. Generally upright, elongated rollers 86 are mounted to the inner surfaces of the side wall extensions 85 by lower angle brackets 87 and upper angle brackets 88. The upper angle brackets project inwardly a slightly greater distance than the lower angle brackets whereby the rollers 86 are tilted slightly at their upper ends in the direction of the extractor 60 or in the direction of each other. This causes said rollers 86 to converge upwardly above the extractor. As best seen in FIG. 2, the rollers 86 are positioned inwardly from the open ends of the main frame 50 and inwardly of the wheels 77, one roller being provided adjacent to each said wheel. Thus it will be seen that in the form of the invention illustrated, each end of the main frame is provided with a pair of wheels 77 and a pair of rollers 86. The wheels 77 of each pair are located on a line that extends generally transversely of the direction of travel of the extractor. The rollers 86 are spaced inwardly of the wheels, and the rollers of each pair at each end of the extractor are also located on a line that extends generally transversely of the direction of travel of said extractor. The directions of the above lines are actually slightly oblique due to the accommodation of the wheels and rollers to the specific structure of the extractor mechanism shown. The wheels 77, in cooperation with the rollers 86, provide guide means for contacting and straightening or centering a skewed load on the laterally extendible extractor 60 when said extractor moves from a load support into the main frame in a manner to be herein later fully discussed.

As hereinbefore noted, the main frame 50 is vertically movable to the level of any selected load support 19 or 20. The masts 30 are U-shaped in cross section (FIG.

2) with their open sides directed toward each other, and the main frame carries at its sides vertically aligned pairs of rollers 90 which are disposed within the channel-shaped masts and rollingly engage the inner surfaces of the flanges thereof. The rollers 90 are idler rollers whose function is to maintain the main frame 50 and, consequently, the extractor 60 in a horizontal position when said main frame is moved up and down the masts 30. The drive means for vertically moving the main frame comprises a motor 91 having a drive sprocket 92 connected to a driven sprocket 93 of a gear reducer 94 through a chain 95. The gear reducer 94, in turn, drives a shaft 96 which is disposed parallel with the aisle 11 and the ends of which project beyond the main frame adjacent to the masts 30. The outwardly projecting ends of the shaft 96 carry pinions 97 which engage a pair of racks 98 mounted on the outer surfaces of flanges of the masts 30. The motor 91, the gear reducer 94, and the shaft 96 are suitably mounted beneath the base 51 between the end walls 52 and the side walls 53.

In operation of the warehousing system, a load support such as that shown at 19 or 20 is preferably provided as an initial pickup and discharge station for initially picking up a load to be subsequently stored in the storage frame 10 or for depositing a load which has been retrieved from said storage frame. Such pickup and discharge station may be a selected one of the supports 19 or 20 of the storage frame such as, for example, a lowermost support adjacent to one end of the frame. Loads are brought to or taken from such pickup and discharge station by any suitable means such as a lift truck, conveyor, or the like (not shown). To initially pick up the load at the selected support or pickup and discharge station, the extractor 60 is laterally extended out of the main frame into the channel members of the support with the platform 80 in the lowered, full line position as shown in FIG. 3. As hereinbefore described, subsequent raising of the platform to the broken line position lifts the load from the channel members whereby it can be moved into the main frame.

A typical load preferably comprises a pallet 100 (FIG. 3) with one or more articles 101 resting thereupon. If, when the load is picked up, the pallet 100 is skewed relative to the extractor 60 and the platform 80 and/or if the article or articles are skewed relative to said pallet, the wheels 77 and the rollers 86 will straighten or center them relative to said extractor and platform, the wheels 77 are disposed at such horizontal level as to engage the pallet 100, and since said wheels are disposed outwardly of the rollers 86, they will engage the edges of a skewed pallet and straighten or center it before the relatively higher articles are engaged by said rollers. As the extractor progresses on into the main frame 30, skewed articles 101 on the pallet 100 will be engaged at their edges by the rollers 86 and substantially straightened or centered relative to said pallet.

The degree or amount of straightening of the load will, of course, depend upon the predetermined tolerance between the wheels 77 and the pallet 100 and the rollers 86 and the articles 101. One of the important purposes of the wheels and rollers is to afford a substantially straight, centered load upon the extractor 60 when said load is subsequently moved out of the main frame at another selected support for storing the load. The more nearly the load conforms in size to the space provided above the selected support 19 or 20 and between adjacent aisle posts 15 or 16, the more accurately said load needs to be centered upon the platform 80.

The wheels 77 and the rollers 86 not only serve to position a load which is being moved onto the main frame, but they also serve to check the load for proper size. For example, an oversize load having either a pallet or articles that are too wide for storing in a given storage frame, are prevented from moving onto the main frame altogether if the distance between the wheels 77 and the rollers 86 is less than the width of such load. This will immediately bring to the attention of the operator the fact that an oversize load is present and appropriate corrective measures can be immediately taken.

As shown in FIG. 3, the rollers are tapered upwardly because a high load needs greater tolerance at the top than adjacent to its base. The reason for this is that if there is any slight tilt in the platform causing a corresponding tilt in the load, there will be an increased horizontal displacement of the load adjacent to its upper end which is further away from the pivot point of the tilt. The objective is to maintain the load substantially on a center line which is perpendicular to an exactly horizontal base, but it is important that allowance be made for the fact that the base may not always be precisely horizontal. For example, the upper surface of the pallet 100 may not always be exactly parallel with its lower surface, and due to wear and use of the parts, the platform 80 may not always be exactly horizontal in its raised position. Also, higher loads tend to rock or away more than relatively lower loads, the sway being the greatest at the top of the load and therefore necessitating greater tolerance in this area.

Although the tapered effect of the rollers as herein illustrated is preferred, it is anticipated that rollers like those shown at 86 mounted on vertical axes could be used in some situations where there is already substantial tolerance at the bottom of the load or where the storage frame openings are sufficiently large and make additional tolerance at the upper end of the load unnecessary. Also, vertical rollers could be used where only relatively low loads are being stored.

It will be understood that many changes in the details herein described and illustrated may be made without, however, departing from the spirit thereof or the scope of the appended claims.

What is claimed is:

1. A load carrier movable between different load support means of an automatic warehousing system for transferring a load to or from any of said support means; said carrier comprising a main frame; a horizontally extendible extractor carried by said main frame and movable horizontally out of said main frame for transferring a load at a load support means; upwardly directed guide means having guide surfaces carried by said main frame and disposed symmetrically on either side of the path of movement of said extractor and extending upwardly adjacent to the sides of a load being moved by said extractor; said guide means being tilted in the direction of said extractor and having portions of said surfaces directed laterally outwardly away from each side of said extractor and a load thereon whereby said guide means on opposite sides of said extractor converge upwardly and tend to straighten and center to load therebetween.

2. A load carrier movable between different load support means of an automatic warehousing system for transferring a load to or from any of said support means; said carrier comprising a main frame; a laterally extendible extractor movable horizontally out of said main frame for transferring a load at a load support means; wheel means on vertical axes carried by said main frame a short distance above the level of said extractor and disposed on either side of of the path of movement of said extractor; upwardly directed, elongated roller means disposed above said wheel means; said roller means disposed on oblique axes tilted in the direction of said extractor and converging upwardly from either side of said extractor; said wheel means and said roller means adapted to engage the edges of a skewed load on said extractor when said extractor is moved into said main frame and substantially straighten the load relative to said extractor.

3. A load carrier as set forth in claim 2 adapted to carry a load comprising a pallet and at least one article resting upon said pallet; wheel means disposed beyond said roller means in the direction of outward travel of said extractor whereby upon return movement of said extractor with a skewed load thereon, said pallet will first engage said wheel means and said article will subsequently engage said roller means to straighten said load.

4. A load carrier as set forth in claim 2 wherein the recited extractor is horizontally movable out of said main frame in either of two opposite directions; said wheel means and said roller means being disposed adjacent to both ends of said main frame whereby a load carried by said extractor is straightened when said extractor is moved into said main frame from either of said opposite directions.

5. A load carrier movable between different load support means of an automatic warehousing system for transferring a load to or from any of said support means; said carrier comprising a main frame; a load supporting extractor movable horizontally out of either end of said main frame in either of two opposite directions to transfer a load at a load support means disposed adjacent to either end of said main frame; wheels mounted on vertical axes carried by said main frame adjacent to the ends thereof on either side of said extractor, said wheels disposed a short distance above the level of said extractor; upwardly directed, elongated rollers disposed inwardly of and higher then said wheels and carried by said wheels and carried by said main frame; said rollers having oblique axes tilted in the direction of said extractor and converging upwardly from either side of said extractor; said carrier adapted to carry a load comprising a pallet and at least one article resting upon said pallet whereby when said extractor moves into said main frame from either said direction with skewed load thereon, said pallet will first engage one of said wheels and said article will subsequently engage one of said rollers to straighten said load as it moves into said main frame.

6. A load carrier movable between different load support means of a warehousing system for transferring a load to or from any of said support means; said carrier comprising a main frame; a laterally extendible extractor movable horizontally out of said main frame for transferring a load at a load support means; upwardly directed, elongated roller means disposed on either side of the path of movement of said extractor; said roller means disposed on oblique axes tilted in the direction of said extractor and converging upwardly from either side of said extractor; said roller means adapted to engage the sides of a skewed load on said extractor when said extractor is moved into said main frame and substantially straighten the load relative to said extractor.

References Cited by the Examiner

UNITED STATES PATENTS

| | | | |
|---|---|---|---|
| 718,543 | 1/03 | Starks | 214—16.4 |
| 2,652,938 | 9/53 | Murphy | 214—16.1 X |
| 2,667,983 | 2/54 | Billings | 214—16.1 X |
| 2,788,905 | 4/57 | Grove | 214—16.1 X |
| 3,023,916 | 3/62 | Purse | 214—10.5 |
| 3,043,452 | 7/62 | Spillios | 214—16.4 |

FOREIGN PATENTS 777,989    7/57    Great Britain.

HUGO O. SCHULZ, *Primary Examiner.*

GERALD M. FORLENZA, *Examiner.*